(12) United States Patent
Nakayama et al.

(10) Patent No.: US 11,721,863 B2
(45) Date of Patent: Aug. 8, 2023

(54) SEALED BATTERY

(71) Applicant: Toyota Jidosha Kabushiki Kaisha, Toyota (JP)

(72) Inventors: Hiroyuki Nakayama, Okazaki (JP); Fumihiko Ishiguro, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 17/073,662

(22) Filed: Oct. 19, 2020

(65) Prior Publication Data
US 2021/0143374 A1    May 13, 2021

(30) Foreign Application Priority Data
Nov. 8, 2019 (JP) ................ 2019-203139

(51) Int. Cl.
| | | |
|---|---|---|
| *H01M 50/172* | (2021.01) | |
| *H01M 50/116* | (2021.01) | |
| *H01M 50/183* | (2021.01) | |
| *H01M 50/543* | (2021.01) | |

(52) U.S. Cl.
CPC ....... *H01M 50/172* (2021.01); *H01M 50/116* (2021.01)

(58) Field of Classification Search
CPC . H01M 50/116; H01M 50/172; H01M 50/183
See application file for complete search history.

(56) References Cited

U.S. PATENT DOCUMENTS

| | | | | |
|---|---|---|---|---|
| 2005/0095502 A1* | 5/2005 | Sugimune | ........... | H01M 50/172 429/180 |
| 2016/0099441 A1* | 4/2016 | Harayama | ........... | H01M 50/119 429/158 |
| 2016/0181589 A1* | 6/2016 | Yokoyama | .......... | H01M 50/528 429/61 |
| 2017/0229686 A1* | 8/2017 | Takasu | ................ | H01M 50/531 |
| 2018/0130995 A1 | 5/2018 | Nemoto et al. | | |
| 2019/0189998 A1* | 6/2019 | Muroya | .............. | H01M 50/588 |
| 2019/0273277 A1* | 9/2019 | Wakimoto | .......... | H01M 50/183 |

FOREIGN PATENT DOCUMENTS

| | | | |
|---|---|---|---|
| CN | 105144424 A | 12/2015 | |
| CN | 107046109 A | 8/2017 | |
| CN | 110224105 A | 9/2019 | |

(Continued)

*Primary Examiner* — Ula C Ruddock
*Assistant Examiner* — Amanda Rosenbaum
(74) *Attorney, Agent, or Firm* — Dinsmore & Shohl LLP

(57) ABSTRACT

A sealed battery includes a case, an internal terminal, an external terminal, and an insulating holder. The internal terminal of the sealed battery includes a current collector connected to the electrode body, a shaft portion exposed outside the case, and a riveted portion that is provided on an end of the shaft portion outside of the case and is pressure-deformed so as to extend along an upper surface of the external terminal. The insulating holder includes a heat resistant portion formed of an insulating material having higher heat resistance than other regions of the insulating holder and the heat resistant portion is disposed in contact with the external terminal at least below a boundary between the riveted portion and the external terminal.

19 Claims, 3 Drawing Sheets

(56) References Cited

FOREIGN PATENT DOCUMENTS

| | | |
|---|---|---|
| JP | 2013-134869 A | 7/2013 |
| JP | 5656592 B2 | 1/2015 |
| JP | 2016-119210 A | 6/2016 |
| JP | 2016-219380 A | 12/2016 |
| JP | 2017-142929 A | 8/2017 |
| JP | 6268911 B2 | 1/2018 |
| JP | 2019-153440 A | 9/2019 |
| KR | 10-2016-0003727 A | 1/2016 |
| KR | 10-2019-0045130 A | 5/2019 |

* cited by examiner

SEALED BATTERY

CROSS-REFERENCE TO RELATED APPLICATIONS

This application claims priority to Japanese Patent Application No. 2019-203139 filed on Nov. 8, 2019, which is incorporated herein by reference in its entirety including the specification, drawings and abstract.

BACKGROUND

1. Technical Field

The present disclosure relates to a sealed battery.

2. Description of Related Art

Secondary batteries such as lithium-ion secondary batteries and nickel-hydrogen batteries are becoming increasingly important as power sources to be mounted on vehicles or power sources for personal computers, mobile terminals, and the like. The secondary battery described above is constructed, for example, as a sealed battery in which an electrode body is accommodated in a case in a sealed state. Such a sealed battery normally has a terminal structure for electrically connecting the electrode body in the case and an external device (other battery, motor, or the like).

Examples of the terminal structure of the sealed battery described above are disclosed in Japanese Unexamined Patent Application Publication No. 2016-219380 (JP 2016-219380 A), Japanese Patent No. 5656592 (JP 5656592 B), and Japanese Patent No. 6268911 (JP 6268911 B). For example, a battery terminal structure disclosed in JP 2016-219380 A includes a lid member that covers a case accommodating a power generating element (electrode body) from above and includes a first hole, an external terminal that is provided above the lid member and includes a second hole, an insulating member (insulating holder) that is provided between the lid member and the external terminal, insulates the lid member from the external terminal, and includes a third hole, and an internal terminal that electrically connects the external terminal and the power generating element. The internal terminal includes a shaft portion that passes through the first hole, the second hole, and the third hole, and a riveted portion that is provided above the shaft portion and rivets the external terminal. In this type of sealed battery, each member constituting the terminal structure is pressed against a case (lid) when riveting is performed, and is fixed in a pressurized state. Accordingly, the first hole of the lid member is sealed and the inside of the case is sealed.

SUMMARY

In recent years, demands for safety and durability of sealed batteries have further increased, and it is desired to maintain sealing properties of inside of a case at a high level. The present disclosure provides a technique capable of suitably maintaining the sealing properties of an inner portion of a case.

The present disclosure provides a sealed battery having the following configurations.

An aspect of the disclosure relates to a sealed battery including a case that accommodates an electrode body, an internal terminal connected to the electrode body in the case, an external terminal having a plate shape and bonded to the internal terminal at a position outside the case, and an insulating holder that is disposed between the case and the external terminal. The internal terminals of the sealed battery may include a current collector that is connected to the electrode body at a position inside the case, a shaft portion that penetrates the case, the insulating holder, and the external terminal and is exposed to an outside of the case, and a riveted portion that is provided on an end of the shaft portion outside of the case and is pressure-deformed so as to extend along an upper surface of the external terminal. The insulating holder of the sealed battery disclosed herein may include a heat resistant portion. The heat resistant portion is an insulating material having higher heat resistance than other regions of the insulating holder, and the heat resistant portion is disposed in contact with the external terminal at least below a boundary between the riveted portion and the external terminal.

In a case where it is possible to suppress melting of the insulating holder during a manufacturing process or charging and discharging, in order to maintain the high sealing properties of the case, it is possible to suppress a deterioration of the sealing properties of the case. Specifically, a large amount of heat may be generated in the riveted portion of the internal terminal or the external terminal due to a welding process in the manufacturing process or resistance heat generation during charging and discharging. At this time, in a case where the heat is transferred to the insulating holder disposed below the external terminal, a surface of the insulating holder may be slightly melted and a thickness thereof may be reduced. In this case, the pressure applied to each member constituting the terminal structure may be released and the sealing properties of the inside of the case may be reduced. As one technique for suppressing the deterioration of the sealing properties due to the melting of the insulating holder, forming the insulating holder with a heat resistant resin may be considered. However, since the heat resistant resin generally has a low insulating property, the external terminal and the case may not be suitably insulated from each other, unless the thickness of the insulating holder is increased. When the thickness of the insulating holder is increased, it needs to change dimensions of other members as well, so that it needs to change the standard of the entire sealed battery.

A region most likely to generate heat during the manufacturing process and charging and discharging is a boundary between the riveted portion and the external terminal. It is considered that, in a case where the heat resistant material is partially disposed below the heat generating region, it is possible to suppress the deterioration of the sealing properties due to melting of the insulating holder, without increasing the thickness of the insulating holder. According to the above aspect, the heat resistant portion formed of an insulating material having relatively high heat resistance is disposed in contact with the external terminal at least below a boundary between the riveted portion and the external terminal. Accordingly, it is possible to suppress the deterioration of the sealing properties due to the melting of the insulating holder, without increasing the thickness of the insulating holder.

In the aspect, the heat resistant portion may be an insulating material having a heat resistant temperature of 150° C. or higher. Therefore, it is possible to more suitably suppress the deterioration of the sealing properties due to the melting of the insulating holder.

In the aspect, the heat resistant portion may be a heat resistant resin containing one selected from polyethylene terephthalate, polyphenylene sulfide, a phenol resin, a polyimide resin, polyether ether ketone, and polyphenyl sulfone.

In the aspect, a comparative tracking index (CTI) of a region of the insulating holder excluding the heat resistant portion may be 600 V or more. By forming the other region excluding the heat resistant portion with an insulating resin having a high insulating property, an increase in thickness of the insulating holder can be suitably suppressed.

In the aspect, the region of the insulating holder excluding the heat resistant portion may be an insulating resin containing one selected from polyamide 6, polyamide 66, an acetal resin, and a polyacetal resin.

In the aspect, the insulating holder may have a thickness of 1.4 mm or less. According to the aspect, even in a case where the thickness of the insulating holder is maintained at 1.4 mm or less, it is possible to suppress the deterioration of the sealing properties due to melting of the insulating holder.

In addition, in the aspect, the sealed battery may further include a welding mark that straddles the riveted portion of the internal terminal and the external terminal. As described above, in the manufacturing process of the sealed battery, the riveted portion of the internal terminal may be welded to the external terminal. While the welding process described above may be used from a viewpoint of improving the conductivity between the internal terminal and the external terminal, it may also cause the deterioration of the sealing properties due to melting of the insulating holder. On the other hand, according to the aspect, it is possible to suppress the deterioration of the sealing properties due to the melting of the insulating holder. Therefore, in the aspect, a particularly suitable effect can be exhibited in the sealed battery that welds a riveted portion and the external terminal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
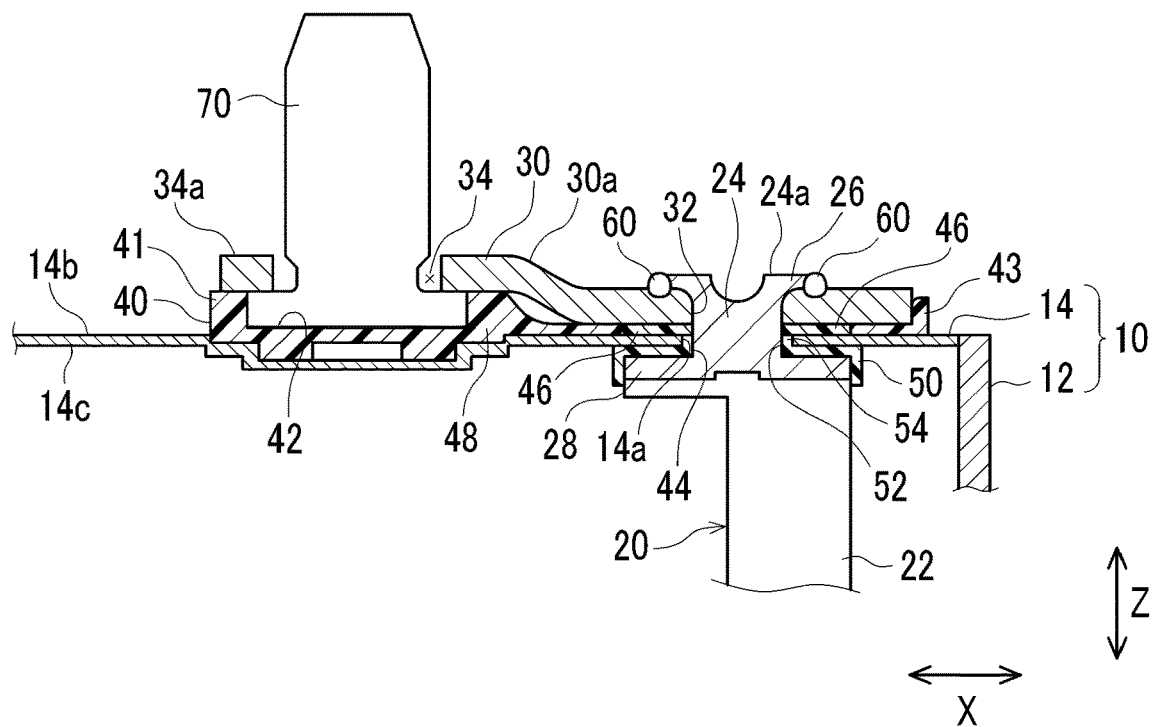
FIG. 1 is a sectional view schematically showing a terminal structure of a sealed battery according to a first embodiment of the present disclosure.

Hereinafter, a sealed battery according to an embodiment of the present disclosure will be described with reference to the drawings. In the following drawings, the same reference numerals are given to the members and parts that can obtain the same action. Dimensional relationships (length, width, thickness, and the like) in each drawing do not reflect the actual dimensional relationships. In addition, matters other than matters particularly referred to in the present specification and matters for carrying out the present disclosure (for example, general techniques relating to construction of a sealed battery such as a configuration and a manufacturing method of an electrode body or an electrolyte) can be understood as a design matter for those skilled in the art based on the related art in the field. In the present embodiment, a lithium ion secondary battery is described as an example of a sealed battery, but the sealed battery disclosed herein is not limited to a lithium ion secondary battery, and may be, for example, a nickel hydrogen battery or the like.

First Embodiment

Figure 2:
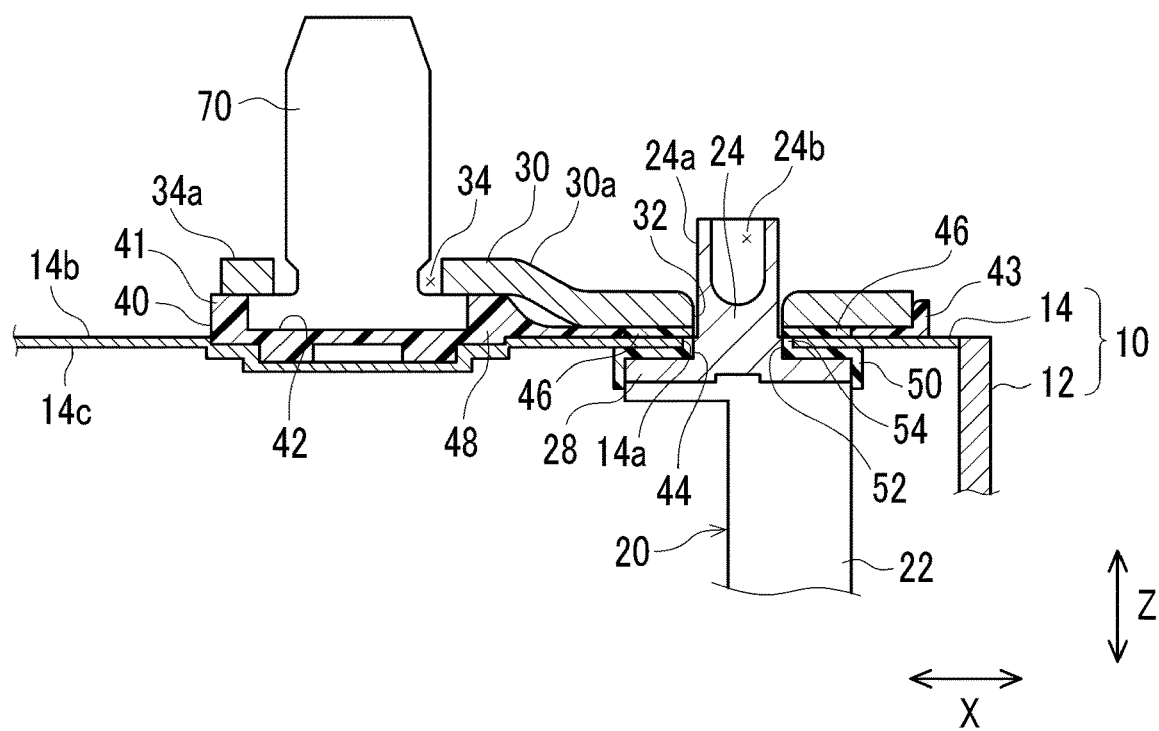
FIG. 2 is a sectional view schematically showing a state of the terminal structure of the sealed battery shown in FIG. 1 before the riveting step.

FIG. 1 is a sectional view schematically showing a terminal structure of a sealed battery according to the first embodiment. FIG. 2 is a sectional view schematically showing a state of the terminal structure of the sealed battery shown in FIG. 1 before the riveting step. In each drawing, a symbol X indicates a "width direction (of the sealed battery)" and a symbol Z indicates a "height direction (of the sealed battery)". These directions are defined for convenience of description, and are not intended to limit the direction in which the sealed battery disclosed herein is installed.

As shown in FIG. 1, a sealed battery 100 according to the present embodiment includes a case 10, an internal terminal 20, an external terminal 30, and an insulating holder 40. Hereinafter, each member will be described.

Case

The case 10 includes a rectangular case body 12 having an open upper surface and a plate-shaped lid body 14 that covers an opening on an upper surface of the case body 12. In some embodiments, the case body 12 and the lid body 14 may be mainly composed of an inexpensive metal material having a predetermined strength such as an aluminum alloy. In addition, the lid body 14 is formed with an opening 14a into which a shaft portion 24 of the internal terminal 20 is inserted.

Although not shown, an electrode body that is a power generation element is accommodated in an inner portion of the case 10. The electrode body includes a positive electrode and a negative electrode. Typically, the electrode body includes a positive electrode sheet obtained by applying a positive electrode mixture layer to a surface of a positive electrode current collector foil, a negative electrode sheet obtained by applying a negative electrode mixture layer to a surface of a negative electrode current collector foil, and an insulating separator interposed between the positive electrode sheet and the negative electrode sheet. In addition, although not shown as the electrode body, an electrolyte such as a non-aqueous electrolyte solution is also accommodated in the inner portion of the case 10. Regarding materials of the electrode body and the electrolyte, the same materials as those used in the general lithium ion secondary battery of the related art can be used without any particular limitation and will not be specifically described, because it is not technique for characterizing the technique disclosed herein.

Internal Terminal

The internal terminal 20 is a conductive member connected to the electrode body (typically, the positive electrode current collector foil or the negative electrode current collector foil) in the case 10. A metal material having a predetermined conductivity is used for the internal terminal 20. In some embodiments, the metal material of the internal terminal 20 may be suitably selected in consideration of the material to be connected, conductivity, strength, material cost, and the like. For example, the internal terminal 20 may be formed of the same kind of metal material as that of a current collector foil of the electrode body to be connected. Accordingly, the internal terminal 20 and the electrode body can be connected with low resistance and high strength. In a general lithium ion secondary battery, since copper (Cu) or a copper alloy is used for the negative electrode current collector foil, copper or a copper alloy may be also used for the internal terminal 20 on the negative electrode side. On the other hand, since aluminum (Al) or an aluminum alloy is used for the positive electrode current collector foil, aluminum or an aluminum alloy may be used for the internal terminal 20 on the positive electrode side.

The internal terminal 20 of the present embodiment includes a current collector 22, a shaft portion 24, and a riveted portion 26. The current collector 22 is connected to the electrode body in the case 10. Specifically, the current collector 22 is a plate-shaped member that extends downward in a height direction Z (inward of the case 10). A lower end of the current collector 22 is connected to the electrode body. The connection portion between the current collector 22 and the electrode body is bonded by a well-known bonding technique of the related art such as ultrasonic welding, laser welding, resistance welding, or the like. In the internal terminal 20 according to the present embodiment, a flat plate-shaped pedestal portion 28 arranged substantially parallel to the lid body 14 is provided at an upper end of the current collector 22.

The shaft portion 24 is a portion penetrated through the case 10, the insulating holder 40, and the external terminal 30 and exposed to the outside of the case 10. As shown in FIG. 2, the shaft portion 24 before riveting is a cylindrical member that is erected from the pedestal portion 28 upward in the height direction Z (outside the case 10). The cylindrical shaft portion 24 is formed with an inner cavity 24b recessed along an axial direction (height direction Z). The riveting is performed with respect to an upper end 24a of the cylindrical shaft portion 24 (that is, the outer end of the case 10) and the upper end 24a of the shaft portion 24 is deformed under pressure to form the riveted portion 26 as shown in FIG. 1. Specifically, a pressing jig is inserted into the inner cavity 24b of the shaft portion 24 shown in FIG. 2 and the upper end 24a is deformed under pressure so that the inner cavity 24b expands in diameter. Accordingly, the riveted portion 26 extending along an upper surface 30a of the external terminal 30 is formed on the upper end 24a of the shaft portion 24 (see FIG. 1). By performing the riveting process, the internal terminal 20 and the external terminal 30 are bonded to each other.

In the present embodiment, a welding process is performed on a boundary between the riveted portion 26 and the external terminal 30, in order to improve the conductivity and the bonding strength between the internal terminal 20 and the external terminal 30. Accordingly, in the sealed battery 100 according to the present embodiment, a welding mark 60 is formed so as to straddle the riveted portion 26 of the internal terminal 20 and the external terminal 30. Various welding techniques such as laser welding, resistance welding, and ultrasonic welding can be used in the welding process between the riveted portion 26 and the external terminal 30 without any particular limitation. Among these welding techniques, laser welding may be used, from a viewpoint of easily performing precise welding.

External Terminal

The external terminal 30 is a plate-shaped conductive member that is bonded to the internal terminal 20 on the outside of the case 10. As described above, the external terminal 30 is bonded to the shaft portion 24 (riveted portion 26) of the internal terminal 20 that is deformed by riveting. The plate-shaped external terminal 30 is disposed so as to extend in a width direction X along an outer surface 14b of the lid body 14 (case 10). An internal terminal insertion hole 32 is formed at one end of the external terminal 30 in the width direction X. In addition, a bolt insertion hole 34 is formed at the other end of the external terminal 30 in the width direction X.

Insulating Holder

The insulating holder 40 is an insulating member that suppresses the conductive terminals (internal terminal 20 and external terminal 30) and the case 10 (lid body 14) from being electrically connected to each other. The insulating holder 40 is disposed between the outer surface 14b (case 10) of the lid body 14 and the external terminal 30. A bolt accommodation portion 42 for accommodating a lower end of a bolt 70 and a first insertion hole 44 for inserting the shaft portion 24 of the internal terminal 20 are formed on the insulating holder 40. A resin material that can be used for this type of insulating member can be used for the insulating holder 40, without any particular limitation. Examples of the resin material include an insulating resin such as a polyamide resin, a polyacetal resin, and a polyimide resin.

The insulating holder 40 according to the present embodiment includes a heat resistant portion 46 formed of an insulating material having higher heat resistance than the other regions of the insulating holder 40. The heat resistant portion 46 is disposed below the boundary between the riveted portion 26 and the external terminal 30 (below the welding mark 60 in the present embodiment) in contact with the external terminal 30. As will be described later in detail, with the configuration described above, it is possible to suppress the deterioration of the sealing properties due to melting of the insulating holder 40, without increasing the thickness of the insulating holder 40.

In the following description, the other region of the insulating holder 40 excluding the heat resistant portion 46 is referred to as a "holder main body 48". The holder main body 48 may be formed of an insulating resin having a high insulating property. Accordingly, the case 10 (lid body 14) and the external terminal 30 can be suitably insulated from each other, while suppressing an increase in thickness of the insulating holder 40. For example, a comparative tracking index (CTI) of the holder main body 48 may be 400 V or higher, 500 V or higher, 550 V or higher, or 600 V or higher. In other words, for the holder main body 48, a resin material classified into a material group I and a material group II in the material classification based on JISC60664 may be used. When a thickness of the insulating holder 40 is suppressed to 1.4 mm or less, the holder main body 48 may be formed of the material group I having the CTI of 600 V or higher. Examples of the insulating resin of the material group I include polyamide 6, polyamide 66, an acetal resin, and a polyacetal resin.

Although there is no intention to limit the sealed battery disclosed herein, a heat resistant temperature of the holder main body 48 is 80° C. or higher or 90° C. or higher. Accordingly, it is possible to suppress the holder main body 48 from being melted by the heat generated through the heat resistant portion 46. As described above, a resin material having a high heat resistant temperature tends to have a low CTI (that is, insulating property). Therefore, an upper limit of the heat resistant temperature of the holder main body 48 is appropriately 120° C. or lower (or 100° C. or lower).

Other Members

Although it is not limited to the technology disclosed herein, the sealed battery 100 according to the present embodiment includes a gasket 50 and the bolt 70, in addition to the members described above.

The gasket 50 is an insulating elastic member that is disposed between an inner surface 14c of the lid body 14 and the pedestal portion 28 of the internal terminal 20. The gasket 50 is provided to suppress the internal terminal 20 and the lid body 14 (case 10) from being electrically connected to each other. The gasket 50, which is an elastic member, is sandwiched between the riveted portion 26 and the pedestal portion 28 of the internal terminal 20 in a pressurized state. Accordingly, the gasket 50 also has a function of suppressing the deterioration of the sealing properties by maintaining the pressure on the other members (external terminal 30, insulating holder 40, and lid body 14) sandwiched between the riveted portion 26 and the pedestal portion 28. The gasket 50 includes a second insertion hole 52 through which the shaft portion 24 of the internal terminal 20 is inserted, and a cylindrical protrusion 54 formed around the second insertion hole 52. The protrusion 54 is inserted into the opening 14a of the lid body 14 and is pressure-bonded to a bottom surface of the insulating holder 40. The gasket 50 may be formed of, for example, PFA, PP, EPDM, fluororubber, or the like.

The bolt 70 is a columnar metal member that is erected along the height direction Z and is disposed on an outer portion of the case 10 (typically, above the insulating holder 40). Specifically, a lower end of the bolt 70 is accommodated in the bolt accommodation portion 42 of the insulating holder 40. The bolt 70 is inserted into the bolt insertion hole 34 of the external terminal 30. Although not shown, a screw groove (not shown) is formed on an outer peripheral surface of the bolt 70. In the sealed battery 100, a connection member (bus bar) for connecting to an external device is disposed on a peripheral edge portion 34a of the bolt insertion hole 34 of the external terminal 30, and a nut is fastened to the bolt 70. Therefore, the bus bar and external terminal 30 can be connected easily and strongly.

Sealing Properties Maintaining Effect

As described above, in the sealed battery 100 according to the present embodiment, the heat resistant portion 46 formed of an insulating material having high heat resistance is disposed in contact with the external terminal 30, below the boundary between the riveted portion 26 and the external terminal 30. Accordingly, it is possible to suppress the deterioration of the sealing properties in the case 10 due to melting of the insulating holder 40, without increasing the thickness of the insulating holder 40. Hereinafter, the sealing properties maintaining effect of the present embodiment will be described in detail, using a case where a welding process is performed with laser as an example.

Figure 3:
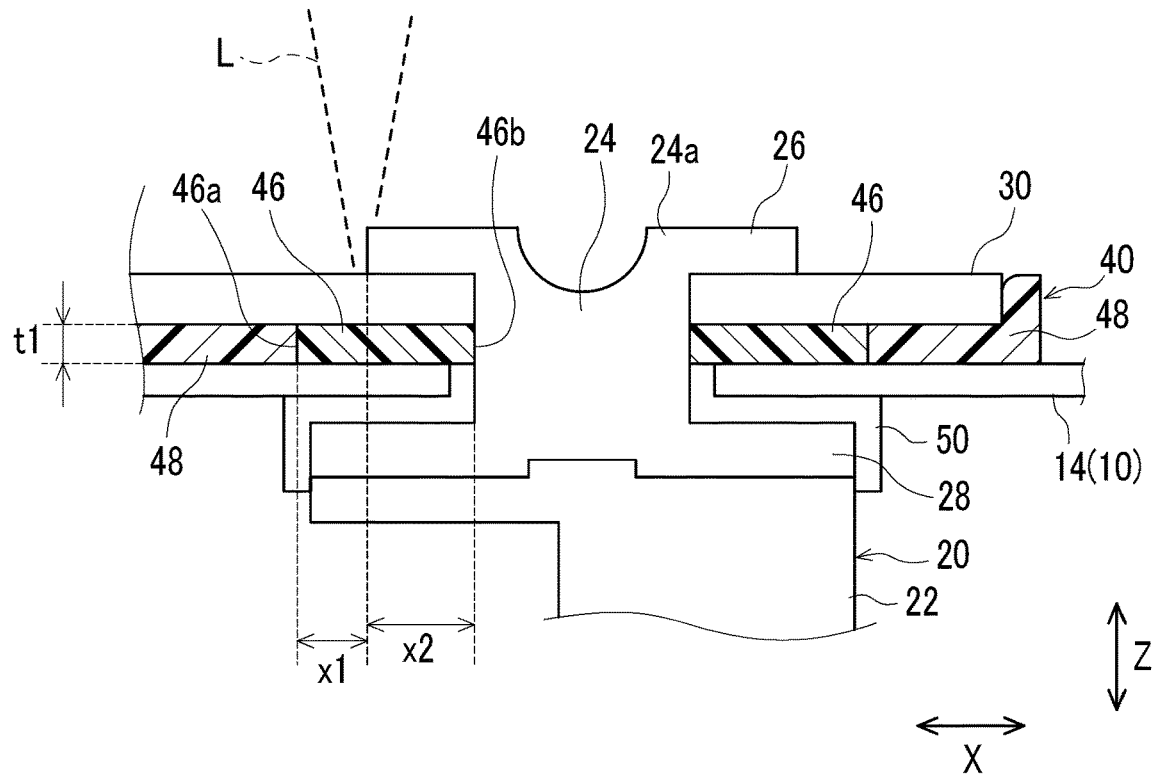
FIG. 3 is a sectional view schematically showing a state in which a riveted portion of an internal terminal and an external terminal are laser-welded in the sealed battery according to the first embodiment of the present disclosure.

FIG. 3 is a sectional view schematically showing a state where the riveted portion of the internal terminal and the external terminal are laser-welded, in the sealed battery according to the first embodiment. As described above, in the present embodiment, the laser welding is performed with respect to the boundary between the riveted portion 26 and the external terminal 30, from a viewpoint of stabilization of conductivity between the internal terminal 20 and the external terminal 30. When the heat of a laser L in the welding process is transferred to the insulating holder 40 via the external terminal 30, the thickness may decrease due to melting of the insulating holder 40. In the general sealed battery 100, in the riveting process described above, the inside of the case 10 is sealed by applying pressure to each member constituting the terminal structure. However, in a case where the thickness of the insulating holder 40 is reduced by the melting, the pressure applied to each member is released, and accordingly, the sealing properties may be deteriorated. On the other hand, in the present embodiment, the heat resistant portion 46 is disposed in contact with the external terminal 30, below the boundary between the riveted portion 26 and the external terminal 30 to be laser-welded. This can suppress the insulating holder 40 from being melted due to the heat of the laser L. In a case where only a part of the insulating holder 40 is formed of a heat resistant material as in the present embodiment, it does not need to increase the thickness of the entire insulating holder 40. Therefore, according to the present embodiment, it is possible to suppress the deterioration of the sealing properties due to melting of the insulating holder 40, without increasing the thickness of the insulating holder 40. For example, according to the present embodiment, although the heat resistant material is used to suppress the deterioration of the sealing properties due to the melting of the insulating holder 40, a thickness t1 (see FIG. 3) of the insulating holder 40 around the internal terminal 20 can be maintained as 1.5 mm or less (or 1.4 mm or less).

From a viewpoint of more suitably suppressing the melting of the insulating holder 40, the heat resistant temperature of the heat resistant portion 46 is 130° C. or higher, 150° C. or higher, 170° C. or higher, or 200° C. or higher. An upper limit of the heat resistant temperature of the heat resistant portion 46 is not particularly limited. That is, the upper limit of the heat resistant temperature of the heat resistant portion 46 may be 1000° C. or lower, 900° C. or lower, or 800° C. or lower.

As an example of the insulating material having the heat resistance temperature described above, a heat resistant insulating resin classified into a material group IIIa and a material group IIIb in the material classification based on JISC60664 is used. Examples of such heat resistant insulating resin include polyethylene terephthalate, polyphenylene sulfide, a phenol resin, a polyimide resin, polyether ether ketone, and polyphenyl sulfone. The heat resistant portion 46 may be formed of a material other than resin, as long as it has a predetermined insulating property and high heat resistance. For example, the heat resistant portion 46 may be formed of a ceramic material such as aluminum oxide ($Al_2O_3$), aluminum nitride (AlN), silicon nitride ($Si_3N_4$), yttrium oxide ($Y_2O_3$), zirconium oxide ($ZrO_2$), or silicon carbide (SiC). When such a ceramic material is used, a material having low thermal conductivity may be selected so that a large amount of heat is not transferred to the holder main body 48 via the heat resistant portion 46. From the above viewpoints, zirconium oxide is suitable among the ceramic materials described above.

In addition, the heat resistant portion 46 and the holder main body 48 may be integrally formed or may be separated. For example, when a resin material is used for the heat resistant portion 46, it is possible to obtain the insulating holder 40 in which the heat resistant portion 46 and the holder main body 48 are integrally molded, by a well-known resin molding technique of the related art such as injection molding or cast molding. On the other hand, when a material (ceramic material or the like) that is difficult to be integrally molded with the holder main body 48 that is a resin member is used for the heat resistant portion 46, a cut-out portion for disposing the heat resistant portion 46 is formed on the holder main body 48, and the insulating holder 40 can be manufactured by fitting the heat resistant portion 46 into the cut-out portion.

Other Embodiments

Although one embodiment of the sealed battery disclosed herein has been described hereinabove, the present disclosure is not limited to the first embodiment, and various structures can be modified.

Second Embodiment

Figure 4:
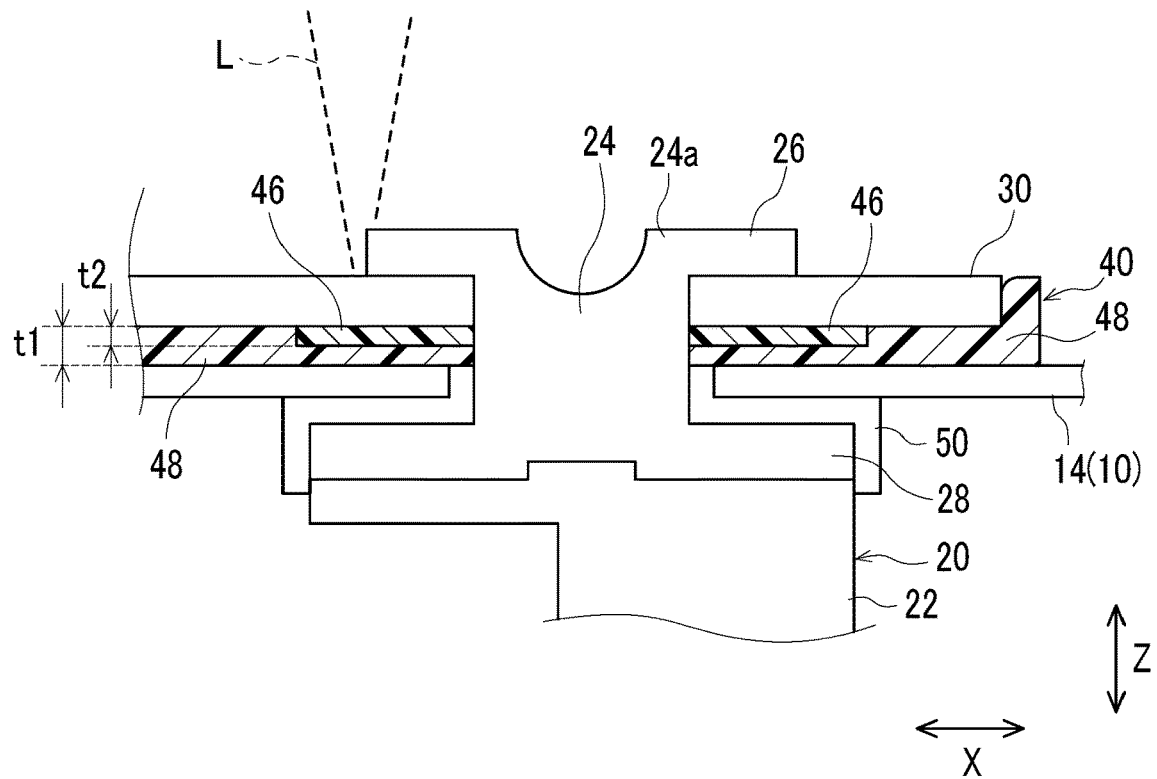
FIG. 4 is a sectional view schematically showing a state in which a riveted portion of an internal terminal and an external terminal are laser-welded in a sealed battery according to a second embodiment of the present disclosure.

For example, in the first embodiment, the heat resistant portion 46 is provided over the entire area of the insulating holder 40 in the thickness direction (height direction Z). However, the heat resistant portion of the sealed battery disclosed herein may be disposed in contact with the external terminal below the boundary between the riveted portion and the external terminal, and is not limited to the first embodiment described above. Specifically, as shown in FIG. 4, the heat resistant portion 46 may be formed from an upper surface side of the insulating holder 40 with a predetermined thickness t2. Even with such a structure, it is possible to suppress the deterioration of the sealing properties due to the melting of the insulating holder 40, without increasing the thickness t1 of the insulating holder 40. When the holder main body 48 is disposed below the heat resistant portion 46 as in the present embodiment, the effect of using a material having low thermal conductivity for the heat resistant portion 46 is particularly exhibited. Therefore, it is possible to more suitably suppress a large amount of heat from being transferred to the holder main body 48 below the heat resistant portion 46.

In addition, in the embodiment, the thickness t2 of the heat resistant portion 46 is 0.1 mm or more. Accordingly, it is possible to suitably suppress the melting of the insulating holder 40 (typically, the holder main body 48). Meanwhile, the upper limit of the thickness t2 of the heat resistant portion 46 is not particularly limited, and the heat resistant portion 46 may be provided over the entire area of the insulating holder 40 in the thickness direction (height direction Z) as in the first embodiment.

Third Embodiment

Figure 5:
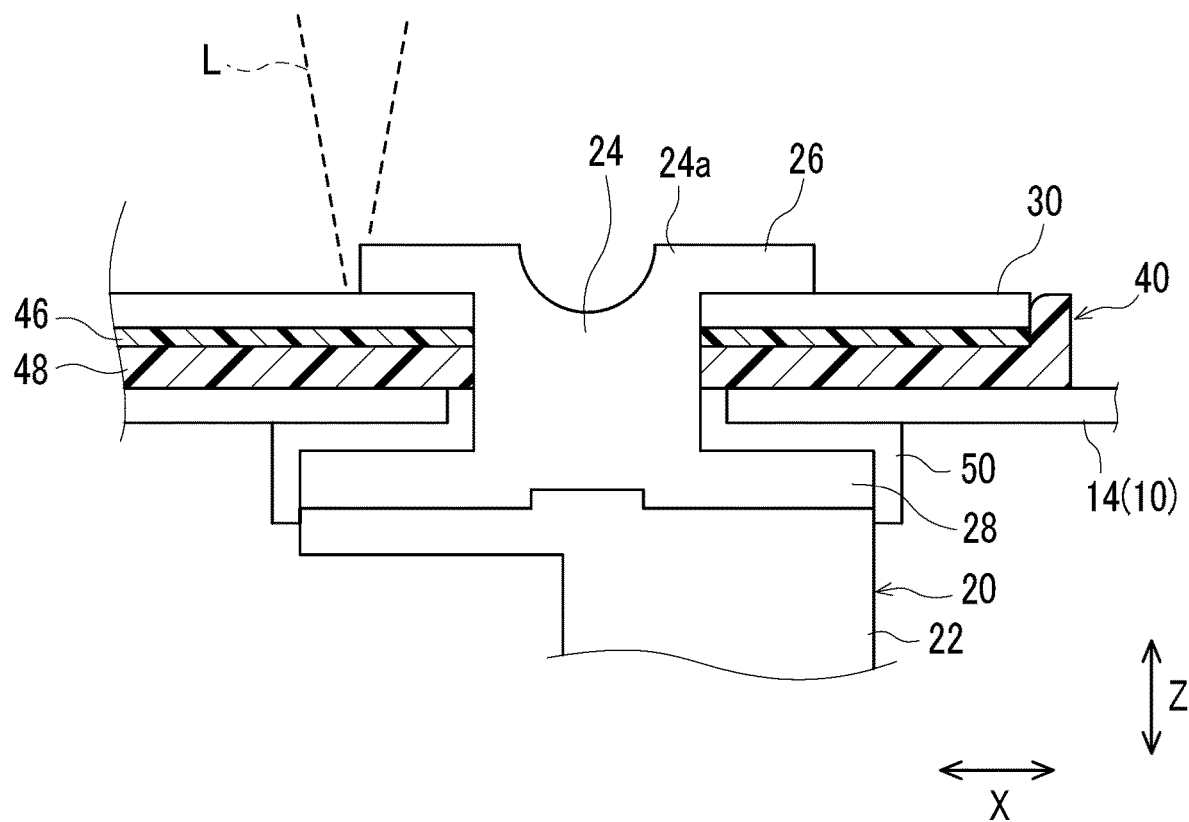
FIG. 5 is a sectional view schematically showing a state in which a riveted portion of an internal terminal and an external terminal are laser-welded in a sealed battery according to a third embodiment of the present disclosure.

In the first and second embodiments described above, the heat resistant portion 46 is disposed in a part of a region including the lower part of the boundary between the riveted portion 26 and the external terminal 30. However, the heat resistant portion 46 may be disposed at least below the boundary between the riveted portion 26 and the external terminal 30, and is not limited to the embodiment described above. For example, as shown in FIG. 5, the heat resistant portion 46 may be disposed on the entire area of the upper surface of the insulating holder 40. That is, an aspect in which a heat resistant sheet (heat resistant portion 46) formed of an insulating material is interposed between the external terminal 30 and the holder main body 48 is also included in the technology disclosed herein. Even in such an aspect, it is possible to suppress the deterioration of the sealing properties due to the melting of the insulating holder 40, while increasing the thickness of the insulating holder 40.

A distance x1 from the boundary between the riveted portion 26 and the external terminal 30 to an outer edge portion 46a of the heat resistant portion 46 (see FIG. 3) is not particularly limited and can be appropriately adjusted, as long as the heat resistant portion 46 is not formed up to the upper surfaces of rising portions 41, 43 (see FIG. 1) of the insulating holder 40. However, from a viewpoint of more suitably suppressing the increase in thickness of the insulating holder 40, the heat resistant portion 46 may be disposed only at a part of the region including the lower portion of the boundary between the riveted portion 26 and the external terminal 30 as in the first embodiment. Meanwhile, a distance x2 from the boundary between the riveted portion 26 and the external terminal 30 to an inner edge portion 46b of the heat resistant portion 46 is not particularly limited, and may be adjusted so that the inner edge portion 46b of the heat resistant portion 46 comes into contact with the shaft portion 24. Therefore, it is possible to suppress the holder main body 48 from being heated via the shaft portion 24 of the internal terminal 20, thereby more suitably suppressing the melting of the insulating holder 40.

Fourth Embodiment

In the first embodiment, since the riveted portion 26 of the internal terminal 20 and the external terminal 30 are welded, the welding mark 60 that straddles the riveted portion 26 and the external terminal 30 is formed. However, the effect of maintaining sealing properties by the technique disclosed herein is exhibited even in situations other than the welding process described above. That is, the technique disclosed herein is not limited to the aspect in which the riveted portion and the external terminal are welded. Specifically, the boundary between the riveted portion and the external terminal may have a high temperature (approximately 150° C.) due to resistance heat generation during charge and discharge. In the sealed battery disclosed herein, the heat resistant portion is disposed below the boundary between the riveted portion and the external terminal. Accordingly, it is also possible to suppress the deterioration of the sealing properties due to the melting of the insulating holder due to the resistance heat generation at the boundary between the riveted portion and the external terminal.

Hereinabove, specific examples of the present disclosure have been described in detail, but these are merely examples and do not limit the scope of the claims. The technology described in the claims includes various modifications and changes of the specific examples described above.

What is claimed is:
1. A sealed battery comprising:
a case that accommodates an electrode body;
an internal terminal connected to the electrode body in the case;
an external terminal having a plate shape and being bonded to the internal terminal at a position outside the case; and
an insulating holder that is disposed between the case and the external terminal, the entirety of the insulating holder being positioned outside the case, wherein:
the internal terminal includes
a current collector that is connected to the electrode body at a position inside the case,
a shaft portion that penetrates the case, the insulating holder, and the external terminal and is exposed to an outside of the case, and
a riveted portion that is provided on an end of the shaft portion outside of the case and is pressure-deformed so as to extend along an upper surface of the external terminal,
the insulating holder includes a heat resistant portion, the heat resistant portion is an insulating material having higher heat resistance than other regions of the insulating holder, the heat resistant portion is disposed in contact with the external terminal at least below a boundary between the riveted portion and the external terminal; and the heat resistant portion is disposed in contact with the shaft portion of the internal terminal.

2. The sealed battery according to claim 1, wherein the heat resistant portion is an insulating material having a heat resistant temperature of 150° C. or higher.

3. The sealed battery according to claim 2, wherein the heat resistant portion is a heat resistant resin containing one selected from polyethylene terephthalate, polyphenylene sulfide, a phenol resin, a polyimide resin, polyether ether ketone, and polyphenyl sulfone.

4. The sealed battery according to claim 1, wherein a comparative tracking index (CTI) of a region of the insulating holder excluding the heat resistant portion is 600 V or more.

5. The sealed battery according to claim 4, wherein the region of the insulating holder excluding the heat resistant portion is an insulating resin containing one selected from polyamide 6, polyamide 66, an acetal resin, and a polyacetal resin.

6. The sealed battery according to claim 1, wherein the insulating holder has a thickness of 1.4 mm or less.

7. The sealed battery according to claim 1, further comprising a welding mark that straddles the riveted portion of the internal terminal and the external terminal.

8. The sealed battery according to claim 1, further comprising a gasket positioned between the case and a pedestal portion of the internal terminal.

9. The sealed battery according to claim 1, wherein the insulating holder further comprises a holder main body.

10. The sealed battery according to claim 9, wherein a heat resistance temperature of the holder main body is from 80° C. to 120° C. and a heat resistance temperature of the heat resistant portion is from 150° C. to 1000° C.

11. A sealed battery comprising:

a case that accommodates an electrode body;

an internal terminal connected to the electrode body in the case;

an external terminal having a plate shape and being bonded to the internal terminal at a position outside the case;

a gasket positioned between the case and a pedestal portion of the internal terminal; and an insulating holder that is disposed between the case and the external terminal, wherein:

the internal terminal includes
- a current collector that is connected to the electrode body at a position inside the case,
- a shaft portion that penetrates the case, the insulating holder, and the external terminal and is exposed to an outside of the case, and
- a riveted portion that is provided on an end of the shaft portion outside of the case and is pressure-deformed so as to extend along an upper surface of the external terminal, the insulating holder includes a heat resistant portion, the heat resistant portion is an insulating material having higher heat resistance than other regions of the insulating holder, the heat resistant portion is disposed in contact with the external terminal at least below a boundary between the riveted portion and the external terminal; and the heat resistant portion is disposed in contact with the shaft portion of the internal terminal.

12. The sealed battery according to claim 11, wherein the heat resistant portion is an insulating material having a heat resistant temperature of 150° C. or higher.

13. The sealed battery according to claim 12, wherein the heat resistant portion is a heat resistant resin containing one selected from polyethylene terephthalate, polyphenylene sulfide, a phenol resin, a polyimide resin, polyether ether ketone, and polyphenyl sulfone.

14. The sealed battery according to claim 11, wherein a comparative tracking index (CTI) of a region of the insulating holder excluding the heat resistant portion is 600 V or more.

15. The sealed battery according to claim 14, wherein the region of the insulating holder excluding the heat resistant portion is an insulating resin containing one selected from polyamide 6, polyamide 66, an acetal resin, and a polyacetal resin.

16. The sealed battery according to claim 11, wherein the insulating holder has a thickness of 1.4 mm or less.

17. The sealed battery according to claim 11, further comprising a welding mark that straddles the riveted portion of the internal terminal and the external terminal.

18. The sealed battery according to claim 11, wherein the insulating holder further comprises a holder main body.

19. The sealed battery according to claim 18, wherein a heat resistance temperature of the holder main body is from 80° C. to 120° C. and a heat resistance temperature of the heat resistant portion is from 150° C. to 1000° C.

* * * * *